United States Patent [19]

Nakano et al.

[11] Patent Number: 4,876,324

[45] Date of Patent: Oct. 24, 1989

[54] HIGH MOLECULAR WEIGHT ORTHO CRESOL-NOVOLAK RESINS AND PROCESS FOR THE PREPARATION THEREOF USING ALCOHOLIC OR ACIDIC ORGANIC SOLVENTS

[75] Inventors: Yoshitomo Nakano; Masumi Kada, both of Mie, Japan

[73] Assignee: Mitsubishi Petrochemical Co., Ltd., Tokyo, Japan

[21] Appl. No.: 49,335

[22] Filed: May 13, 1987

Related U.S. Application Data

[62] Division of Ser. No. 741,138, Jun. 4, 1985, abandoned.

[30] Foreign Application Priority Data

Jun. 8, 1984 [JP] Japan ................................ 59-116510

[51] Int. Cl.$^4$ ............................................. C08G 8/12
[52] U.S. Cl. ...................................... 528/142; 528/144
[58] Field of Search ............................... 528/142, 144

[56] References Cited

U.S. PATENT DOCUMENTS

| | | | |
|---|---|---|---|
| 1,997,614 | 4/1935 | Wakefield | 528/142 |
| 2,293,805 | 8/1942 | Cooke et al. | 528/142 |
| 3,005,797 | 10/1961 | Larkin et al. | 528/144 |
| 3,894,981 | 7/1975 | Kruglikov et al. | 528/140 |
| 4,345,054 | 8/1982 | Takeda et al. | 525/480 |
| 4,564,575 | 1/1986 | Perreault et al. | 430/165 |
| 4,649,188 | 3/1987 | Bertram et al. | 528/142 |

FOREIGN PATENT DOCUMENTS

| | | | |
|---|---|---|---|
| 2738417 | 4/1978 | Fed. Rep. of Germany | 528/142 |
| 0211355 | 7/1984 | Fed. Rep. of Germany | 528/144 |
| 65515TA | 3/1972 | U.S.S.R. | 528/165 |
| 1430343 | 3/1976 | United Kingdom | 528/142 |

OTHER PUBLICATIONS

F. S. Granger, *Industrial and Engineering Chemistry*, 29, 860–866 (1937).

R. F. Hunter, V. Vand, *Journal of Applied Chemistry*, (London), 1, 298 (1951).

*Primary Examiner*—John Kight
*Assistant Examiner*—Frederick Krass
*Attorney, Agent, or Firm*—Oblon, Spivak, McClelland, Maier & Neustadt

[57] ABSTRACT

Orthocresol or a mixture of orthocresol and paracresol and an aldehyde compound or a derivative thereof are subjected to polycondensation in a solvent selected from an aliphatic alcohol having 3 to 12 carbon atoms, a glycol ether having 3 to 6 carbon atoms, benzyl alcohol and an aliphatic carboxylic acid having 2 to 6 carbon atoms, in the presence of an acid catalyst, to obtain linear and high molecular weight orthocresol-novolak resins or orthocresol/paracresol random copolymerized novolak resins which have a high softening point of 145° C. or higher and a high number average molecular weight of 1500 or more and which are highly soluble in alcohols and ketones and are highly compatible with resins.

11 Claims, No Drawings

HIGH MOLECULAR WEIGHT ORTHO CRESOL-NOVOLAK RESINS AND PROCESS FOR THE PREPARATION THEREOF USING ALCOHOLIC OR ACIDIC ORGANIC SOLVENTS

This is a division of application Ser. No. 06/741,138, abandoned, filed June 4, 1985.

FIELD OF THE INVENTION

The present invention relates to high molecular weight cresol-novolak resins which are suitable for casting materials, resin varnishes for reinforcement of glass fibers and coating resins. The present invention also relates to a process for the preparation of the cresol novolak resins. Hardened products of the present resins have good heat-resistance and mechanical strength, and therefore the present resins are useful as sealants for electric instruments and structural materials for aircrafts.

BACKGROUND OF THE INVENTION

Generally, Novolak-type phenol resins are prepared by polycondensation of a phenol and an aldehyde in the presence of an acid catalyst.

Novolak type phenol resins obtained by this method generally have a number average molecular weight of 250 to 800, at most 1000, and have a low melting point. Therefore, when these novolak type phenol resins are hardened singly in the presence of a hardener or are hardened together with other kinds of hardening resins and optionally together with a filler and other additives, any hardened resin products having good heat-resistance and good mechanical characteristics cannot be obtained. Other novolak type substituted phenol resins obtained by polycondensing a substituted phenol having an alkyl group or a halogen atom in its p- or o-position with an aldehyde in the presence of an acid catalyst, have a chemical structure similar to the above-mentioned novolak type phenol resins, and have a number average molecular weight of 250 to 800, at most 1200, and a low melting point. Analogously to the above-mentioned novolak type phenol resins, when these novolak type substituted phenol resins are hardened together with other kinds of hardening resins and optionally with a filler and other additives, no hardened resin products having good heat resistance and mechanical characteristics can be obtained either.

As mentioned above, novolak type phenol/formaldehyde resins prepared in the conventional manner generally have a low number average molecular weight of 250 to 800, at most 1200 or less. It is reported, however, that when these novolak type phenol/formaldehyde resins having a low number average molecular weight were fractionated, slight amount of novolak type phenol/formaldehyde resins having a higher molecular weight of about 3,000 to 10,000 or so was found to be contained therein. (cf. "Lecture on Plastic Materials", (15), 'Phenol Resins', pp. 14–24 (by Shinichi Murayama), Nikkan Kogyo Newspaper Press Co of Japan; J. J. Gardikes, F. M. Konrad, Am. Chem. Soc. Div., *Org. Coating and Plastics Chemistry* 26 No. 1 131–137 (1966)). However, these high molecular novolak type phenol/formaldehyde resins thus obtained by such fractionation have a narrow molecular weight distribution, and in addition, partially crosslinked and gelled products tend to be formed in the resins as a contaminant, since the phenol components constituting the resins are trifunctional. Therefore, even if these high molecular novolak type phenol/formaldehyde resins are blended with epoxy resins to obtain resin compositions, which are then hardened, it is impossible to obtain hardened products having sufficiently improved and high heat resistance and mechanical characteristics.

The number average molecular weight of novolak type alkylphenol resins obtained by polycondensing a bifunctional alkylphenol, such as an o-alkylphenol or a p-alkylphenol, with an aldehyde in the presence of an acid catalyst falls, in general, within the range of 250 to 800, and is at most 1200, as mentioned above. Some attempts have heretofore been made in order to obtain high molecular weight novolak type substituted phenol resins, but in every case, the resulting novolak type alkylphenol resins have a number average molecular weight of at most 1200, and thus, no novolak type alkylphenol resin having a sufficiently high number average molecular weight has been obtained yet (cf. F. S. Granger, *Industrial and Engineering Chemistry*, 29 860–866 (1937); J. B. Nierderl and I. W. Ruderman, *Journal of American Chemical Society*, 67, 1176–1177 (1945); R. F. Hunter and V. Vand, *Journal of Applied Chemistry* (London), 1, 298 (1951), etc.). Novolak type alkylphenol resins described in the above-mentioned publications have a low number average molecular weight and a low melting point although they have a chain-like or linear molecular structure; and therefore, even if these resins are blended with epoxy resins to obtain resin compositions, it is impossible to improve the heat resistance and the mechanical properties of hardened products of the compositions because of the same reason as mentioned above.

One of the reasons why a phenol cannot be highly polymerized to form a high molecular weight polymer is that the condensation of a phenol with an aldehyde may occur at two ortho positions and one para position (three positions in total) to the phenolic hydroxyl group of the phenol, resulting in that gelation of polycondensed products tends to occur with ease.

Under the circumstances, some other attempts have been made in order to obtain high molecular weight resins, where a monosubstituted phenol, which has a substituent at the ortho or para position to the phenolic hydroxyl group, is used as one of the starting materials so that there can be only two reactive sites in the used phenol and the occurrence of gelation can be prevented. For example, it is reported in *Journal of Polymer Science*, 20, 75–88 (1956) by W. J. Burke and S. H. Ruteman, et al. that high molecular weight novolak-type chlorophenol resins having a number average molecular weight of 1600 or more, or of 3300 or more, were obtained by polycondensing parachlorophenol with formaldehyde; and it is also reported in *Journal of Polymer Science*, 32, 221–228 (1958) by W. J. Burke and S. H. Ruteman that the polycondensation of parachlorophenol with formaldehyde results in the formation of high molecular weight novolak type chlorophenol resins, the acetylated products of which have a number average molecular weight of 1610 or more, or of 3640 or more. However, these high molecular weight novolak-type chlorophenol resins were afterwards denied by other scholars who studied these resins, and the acetylated products have then proved to be low molecular weight novolak type chlorophenol resins having a number average molecular weight of 1250 or less ("Minoru Imoto and Keikichi Uno, Lecture on Theory of Polymerization Reaction, (8), 'Addition-Polymeriztion and Addition Condensation', Kagaku Dojin; Minoru Imoto and Sjinichi Nakade, Bulletin Chemical Society of Japan, 36, 580–585 (1963)" are referred to.).

On the other hand, it is reported in *Kogyo Kagaku Zasshi* (Magazine of Industrial Chemistry), 66, 95–99 (1963) (by Hideo Narazaki) that novolak type resins having a number average molecular weight of 1,555, 2,735 and 4,560 were obtained by polycondensation of nonylphenol and paraformaldehyde in benzene or toluene in the presence of p-toluenesulfonic acid as a catalyst. However, the formation of the resin having a molecular weight of 4,560 is noted to be accompanied by the formation of solvent hardly soluble components (or gels), and in addition, the report mentions that when p-cresol and nonylphenol were blended in a molar proportion of 2:1 and analogously polymerized, only a resin having a number average molecular weight of 1,355 was obtained.

These reports show that high molecular weight resins may be obtained from nonylphenol used as a starting material of the substituted phenol, which has a high molecular weight, whereas only relatively low molecular weight resins are obtained from cresol, which has a low molecular weight, even though the polymerization degree is the same in both the cases, and that, in the latter case using cresol, if the synthesis of higher molecular weight resins from cresol is intended the formation of solvent insoluble components is inevitable. This, in this manner, it is impossible to obtain any high molecular resins from the cresol.

Japanese Patent OPI No 113/82 discloses a process for the manufacture of high molecular weight orthocresol-novolak resins, and it describes that a linear and high molecular weight orthocresol-novolak resin which has a number average molecular weight (Mn) of 2,010 and which is soluble in N,N'-dimethylacetamide is obtained by reaction of an orthocresol-novolak resin having a number average molecular weight (Mn) of 550 and 37%-formalin as a bifunctional chain extender, in the presence of nitric acid and in toluene as a solvent at 175° C. under pressure, and that the softening point of the obtained resin is 134° C.

However, the softening point of said resin is low or 134° C., and when this resin is blended with an epoxy resin and is hardened, the thermal deformation temperature of the hardened product also is low. In addition, when a paracresol-novolak, paratert-butylphenol-novolak or parachlorophenol-novolak resin is used as a starting material novolak resin, instead of the above used orthocresol-novolak resin, and is polymerized analogously, only novolak-resins having Mn of at most 2,000 to 2,120 may be obtained in every case, and it is difficult to obtain higher molecular weight resins.

The above-mentioned Japanese Patent Application (OPI) exemplified the use of o-dichlorobenzene, diphenyl ether and decalin, in addition to toluene, as a solvent. However, o-dichlorobenzene has a higher boiling point and is toxic, and therefore is difficult to handle; and diphenyl ether is solid at normal temperature and thus is also difficult to handle. Decalin is disadvantageous in that the solubility thereof in high molecular weight cresol-novolak resins is low. It is also reported in the Japanese Patent Application (OPI) that the high molecular weight orthocresol-novolak resins obtained by the method described therein precipitate out when their toluene solution is put into methanol, and thus the resins are noted to be insoluble in methanol.

Japanese Patent Application (OPI) No. 92908/81 discloses high molecular weight orthocresol/paracresol copolymerized novolak resins and a method for preparation of such resins. This mentions that a linear, high molecular weight orthocresol/paracresol copolymerized resin which has an Mn of 1,930 and which is soluble in dimethylacetamide is obtained by reacting an orthocresol-novolak resin having an Mn of 550 with 2,6-dimethylol-p-cresol in the presence of nitric acid and in o-dichlorobenzene as a solvent, at 175° C.; and that the softening point of the obtained resin is 134° C.

However, resins which can be obtained according to the method described in the above publication are only orthocresol/paracresol block copolymers containing orthocresol block copolymer components. Accordingly, the softening point of the copolymer resin obtained by the prior art method, which has an Mn of 1,930 and has a molar ratio of orthocresol to paracresol of 8/2, is 134° C. Japanese Patent Application (OPI) No. 92908/81 further described that the starting materials are reacted in o-dichlorobenzene and the reaction mixture is then put into methanol to remove the remaining nonreacted substances, and thus the formed resin is noted to be insoluble in methanol. Whereas, the random copolymerized novolak resin of the present invention which has the same molecular weight and the same molar ratio of orthocresol/paracresol (=8/2) as the resin of the above-described publication is soluble in methanol.

SUMMARY OF THE INVENTION

An object of the present invention is to provide high molecular weight cresol-novolak resins which are highly soluble in organic solvents, for example, aliphatic alcohols such as methanol and ethanol; ketones such as acetone, methyl ethyl ketone and methyl isobutyl ketone; esters such as ethyl acetate and butyl acetate; and glycol ethers, etc.

Another object of the present invention is to provide a high molecular weight cresol-novolak resin which can be blended with an epoxy resin or a polyisocyanate to obtain a resin composition, and which can be hardened to obtain a hardened product having a good heat-resistance and a good mechanical strength.

Further object of the present invention is to provide a method for the preparation of such resins.

As a result of extensive research it has been found that linear and high molecular weight orthocresol-novolak resins or orthocresol/paracresol random copolymerized novolak resins, which are free from gelled components, which are linear and of high molecular weight and have a high softening point and which are highly soluble in alcohols and ketones and are highly compatible with epoxy resins, can be obtained by condensation-polymerization of an orthocresol with formaldehyde or a mixture of orthocresol and paracresol with formaldehyde, paraformaldehyde or trioxane, in a polar organic solvent such as an alcohol or an alkylcarboxylic acid and in the presence of an acid catalyst.

Accordingly, the present invention provides a method for preparation of high molecular weight cresol-novolak resins having a softening point of 130° C. or higher and having a number average molecular weight of 1,500 or more, comprising polycondensing an orthocresol or a mixture of orthocresol and paracresol with an aldehyde compound or a derivative thereof, in a solvent selected from the group consisting of an aliphatic alcohol having 3 to 12 carbon atoms, a glycol ether having 3 to 6 carbon atoms, benzyl alcohol and an aliphatic carboxylic acid having 2 to 6 carbon atoms, and in the presence of an acid catalyst.

The present invention also provides a linear, high molecular weight cresol-novolak resins having a softening point of 145° C. or higher selected from the group consisting of orthocresol-novolak resins and orthocrosol/paracresol random copolymerized novolak resins having a copolymerized molar ratio of orthocresol/paracresol of 50/50 or more, which are soluble in rethanol and acetone and have a number average molecular weight of 1,500 or more as measured by means of a vapor pressure method using methyl ethyl ketone as a solvent.

DETAILED DESCRIPTION OF THE INVENTION

Cresols:

A cresol components to be reacted with an aldehyde component may be orthocresol alone, or otherwise, less than 50 mol %, preferably less than 30 mol %, of orthocresol may be replaced by paracresol. The use of paracresol is conductive to the improvement of heat resistance of the formed resins, but lowers the solvent solubility of the resins.

Aldehydes:

As an aldehyde component may be used formaldehyde, or trioxane or paraformaldehyde which may be decomposed to form formaldehyde upon heating. In particular, trioxane and paraformaldehyde are preferred since they can lower the water-content in the reaction system. The amount of formaldehyde to be used is 0.7 to 1.5 mols, preferably 0.9 to 1.3 mols, per mole of the phenol component. If the amount of the aldehyde component used is small, only low molecular weight cresol-novolak resins are obtained. On the contrary, if it is too large, the formed resins are apt to be gelled Solvents:

Alcohols which can be used as a reaction solvent preferably have a high boiling point and have a high solubility to novolak resins. Examples of the alcohols include aliphatic alcohols such as propanol, butanol, amyl alcohol, hexanol, heptanol and octanol; glycol ethers such as methoxyethanol, ethoxyethanol and butoxyethanol; and benzyl alcohol.

Organic carboxylic acids, which can also be used as a reaction solvent, include formic acid, acetic acid, propionic acid, butyric acid, etc.

The amount of the solvent to be used is 150 to 300 parts by weight per 100 parts by weight of the above-mentioned cresol component.

Acid Catalysts:

As a catalyst can be used a protonic acid such as hydrochloric acid, nitric acid, sulfuric acid, phosphoric acid, toluenesulfonic acid, oxalic acid, methanesulfonic acid, perchloric acid, etc. However, Lewis acids such as boron trifluoride, boron trifluoride etherates, aluminium trichloride, tin tetrachloride and zinc chloride, which are mentioned to be preferable in Japanese Patent Application (OPI) Nos. 113/82 and 92908/81, are unsuitable in the present invention.

The amount of the catalyst to be used is 0.01 to 20 parts by weight, preferably 1 to 15 parts by weight per 100 parts by weight of the above-mentioned cresol component.

Polycondensation Reaction:

The polycondensation reaction of the present invention can be carried out by any of the following methods:

(1) Both the starting materials of cresol and aldehyde components and a solvent and a catalyst are put into a reactor and then gradually heated, while stirred, to elevate the temperature of the reaction system up to an appropriate reaction temperature; or (2) one of the starting material, i.e., a cresol component and a reaction solvent and a catalyst are put in a reactor, and after heated to the reaction temperature, the other starting material, i.e., an aldehyde component which has been dissolved in an alcohol or carboxylic acid solvent together with a catalyst is added to the reaction system; or (3) both the starting materials of cresol and aldehyde components and a solvent are put in a reactor and then heated up to near the reaction temperature, while stirred, and thereafter, a catalyst or a catalyst containing solvent is added dropwise to the reaction mixture.

In case where orthocresol/paracresol random copolymerized resins are to be manufactured, both cresols must previously be blended well with each other.

The reaction is carried out at 95° C. or higher, preferably at 105° to 150° C. If the reaction temperature is lower, the reaction speed is low, but, if it is higher, a gel fraction tends to be formed.

If the water content in the reaction system is large, formaldehyde is consumed by side reaction, resulting in the decrease of the amount of the formaldehyde to be used in the polymerization, and after all, the molecular weight of the formed resin cannot be increased. In addition, high molecular weight novolak resins are apt to become insoluble in solvents in a high water content circumstance and are precipitated out, at last to form a heterogeneous reaction system, and thus the formation of high molecular weight resins is extremely difficult. Accordingly, the water content in the polycondensation reaction of the present invention is 15 wt. % or less, preferably 10 wt. % or less. It is effective to use a solvent which is azeotropic with water and therefore can eliminate water, such as n-butanol, and carry out the polycondensation reaction under reflux while eliminating the formed water.

Purification:

After the polycondensation reaction has finished, the isolation of the formed cresol-novolak resins is carried out as follows: In the case where a water soluble solvent such as methoxyethanol, ethoxyethanol, acetic acid or formic acid is used, the reaction product mixture is put into water of 10 to 20 times the amount of the reaction mixture whereby the formed resin which is insoluble in water is precipitated out and can be taken out therefrom. In the case where a water insoluble solvent is used, the used catalyst is first eliminated by rinsing or neutralization and then the solvent is distilled off to obtain a fused resin.

Cresol-Novolak Resins:

Orthocresol-novolak resins obtained according to the present invention are easily soluble in carboxylic acids such as acetic acid and propionic acid; alkyl alcohols such as methanol, ethanol and butanol; ketones such as acetone, methyl ethyl ketone, methyl isobutyl ketone and cyclohexaone; esters such as ethyl acetate and butyl acetate; ethers such as tetrahydrofuran and dioxane; and glycol ethers such as methoxyethanol and butoxyethanol.

Thus, the novolak resins of the present invention are easily soluble in various kinds of solvents and are quite free from any insoluble gel content, and therefore, the resins of the present invention reveal to be linear and of high molecular weight.

The number average molecular weight of the resins of the present invention, as measured by VPO method using a solvent of methyl ethyl ketone, is 2,100 to 5,000; and the ratio (Q) of weight average molecular weight to number average molecular weight of the resins, as measured by gel permeation chromatography using tetrahydrofuran as a solvent is 1.5 to 12.

The resins of the present invention have a softening point of 145° to 250° C., as measured by a softening point measuring method where the temperature at which a powdery resin is liquefied and becomes transparent is measured using a microscope.

On the other hand, cresol-novolak resins obtained from a mixture of orthocresol and paracresol are random copolymers and are soluble in ethers such as tetrahydrofuran and dioxane and in dimethylacetamide and dimethylformamide and these do not contain any insoluble gel components. Thus, the obtained resins are linear and of high molecular weight.

The solubility of the random copolymer resins in solvents varies depending upon the molar ratio of the constituting components of orthocresol to paracresol and upon the molecular weight of the resin. The higher the molar ratio of paracresol is and the higher the molecular weight is, the more hardly soluble the resin is. For example, the resins having a molar ratio of paracresol to orthocresol of 5/5 and having a softening point of 145° C. or higher, are soluble in ketones such as acetone and methyl ethyl ketone; glycol ethers such as methoxyethanol and ethoxyethanol; esters such as ethyl acetate; and epichlorohydrin; but are insoluble in alcohols such as methanol and ethanol.

When paracresol is polymerized with paraformaldehyde in the presence of a sulfuric acid catalyst in ethoxyethanol, in the same manner as the present invention, a linear and high molecular weight paracresol-novolak resin having a softening point of higher than 300° C. is formed. However, the thus formed resin is less soluble in solvents, and in particular, hardly soluble in the above-mentioned solvents excepting tetrahydrofuran, dioxane, dimethylformamide and dimethylacetamide. In addition, this is less compatible with epoxy resins and cannot uniformly be blended therewith even when heated and admixed at 150° C. or higher.

Use:

A high molecular weight cresol-novolak resin of the present invention can be blended with a hardening resin such as an epoxy resin, an urethane resin, a urea resin, a melamine resin, a bismaleimide resin, an alkyd resin and an unsaturated polyester resin, to obtain various kinds of hardening resin compositions, and the heat resistance and the mechanical characteristics of the hardened products can be highly improved. In addition, the resins of the present invention can be used as a tackifier for rubbers, a tackifier for adhesives, a printing ink, a coating material, an ink composition for pressure sensitive copying paper, etc.

In particular, the resins of the present invention are highly compatible with epoxy resins, and the present resin can well be blended with an epoxy resin to obtain a hardening resin composition. Examples of the epoxy resins suitable for such use include those obtained from a polyphenol (such as bisphenol A, bisphenol F, brominated-bisphenol A, bisphenol S, phenol-novolak, orthocresol-novolak or 1,1,2,2-tetrakis (4-hydroxyphenyl) ethane) and an epihalohydrin; those obtained from a polyhydric phenol (such as catechol, resorcin or hydroquinone) and an epihalohydrin; glycidyl ether-epoxy resins of a polyhydric alcohol (such as ethylene glycol, butanediol, pentaerythritol or polyethylene glycol); alicyclic epoxy resins such as dicyclopentadiene dioxide, 3,4-epoxycyclohexylmethyl-3,4-epoxycyclohexane carboxylate and vinylcyclohexene dioxide; polyglycidyl ester-epoxy resins of a polycarboxylic acid (such as phthalic acid or hexahydrophthalic acid); polyglycidylamines such as glycidylated diaminodiphenylmethane; and other epoxy resins such as glycidylated aminophenol, etc.

These epoxy resins, which can be blended with the high molecular weight cresol-novolak resins of the present invention are compounds having two or more epoxy groups in the molecule, and the epoxy resin is blended with the cresol-novolak resin of the present invention in a ratio of 0.3 to 2.0 epoxy equivalents, preferably 0.5 to 1.5 epoxy equivalents, of the epoxy resin to one phenolic hydroxyl equivalent of the cresol-novolak resin.

The hardening resin composition can further contain a hardening accelerator such as benzyldimethylamine, imidazoles, tris(dimethylaminomethyl) phenol, $BF_3$.piperidinium salt, etc.; and optionally a filler, a die lubricant and a flame retarding agent.

For example, an orthocresol-novolak resin of the present invention, an epoxy resin and a hardening accelerator are dissolved in a solvent such as acetone or methyl ethyl ketone, to obtain a varnish composition, and a glass cloth is impregnated with said varnish composition and then dried to form a prepreg. Next, a copper foil and several of thus formed prepregs are laminated and hot pressed to obtain a copper-clad laminate for a printed circuit plate.

Apart from this, a high molecular weight orthocresol-novolak resin of the present invention, an epoxy resin, a hardening accelerator, a filler such as silica and a lubricant are kneaded with hot rolls to obtain a molding compound, which is then molded in a transfer molding apparatus to obtain semiconductor sealant parts or other mechanical parts.

Adhesives can be obtained by blending a high molecular weight orthocresol-novolak resin of the present invention, an epoxy resin, a hardening accelerator and other resins such as nylon, polyester, polyvinylbutyral and carboxyl-containing butadienenitrile rubber, optionally together with a filler.

Powdery coating materials can be obtained by blending a high molecular weight orthocresol-novolak resin of the present invention, an epoxy resin, a hardening accelerator and a filler to form a resin mixture, which is kneaded with hot rolls, cooled, powdered in a mill and then sieved and classified.

High molecular weight orthocresol-novolak resins of the present invention are soluble in an aqueous alkali solution. For example, the resin of the present invention can be blended with 1,2-naphthoquinonediazide and dissolved in a solvent to obtain a photoresist. This can be coated on a base plate and dried to form a coat film, and when the coated plate is partially exposed to an ultraviolet ray, only the exposed part can be dissolved and removed out with an aqueous alkali solution.

Effect:

In the case where a linear and high molecular weight orthocresol-novolak resin has a higher softening point, the stability of the resin at a higher temperature increases and decomposition of the resin hardly occurs. The cresol-novolak resin of the present invention can be blended with the above-described epoxy resin and hardened to obtain a hardened product; and the higher the softening point of the used cresol-novolak resin is, the higher the heat-resistance of the hardened product is.

In addition, high molecular weight orthocresol-novolak resins of the present invention have a higher solubility in solvents than other phenol-novolak and paracresol-novolak resins, as described above, and thus, the resins of the present invention are most suitable as resins for varnishes.

The following examples are given to illustrate the present invention in greater detail although the invention is not limited thereto.

EXAMPLE 1

108 g of p-cresol, 32 g of paraformaldehyde and 240 g of ethyl cellosolve were put in a reactor together with 10 g of sulfuric acid, and reacted for 4 hours at 115° C., while stirred.

After the reaction, 17 g of NaHCO$_3$ and 30 g of water were added to the reaction mixture to neutralize the same, and the reaction solution was put in 2 l of water, while rapidly stirred, whereby the precipitated resin was filtrated out and dried, to obtain 115 g of a resin product.

The formed resin was soluble in methanol, ethanol, butanol, octanol, methyl cellosolve, ethyl cellosolve, tetrahydrofuran, dioxane, acetone, methyl ethyl ketone and ethyl acetate, and was free from any gel component. However, this resin was insoluble in benzene, toluene, xylene, chloroform and carbon tetrachloride.

The molecular weight of this resin was measured by means of a vapor pressure method (in methyl ethyl ketone, at 40° C.), and the number average molecular weight thereof was 2,600. The softening point of the resin measured by means of a microscope method was 155° C. The Q-value of the resin was 3.0, as measured by means of a gel permeation chromatography analysis using a tetrahydrofuran solution (hereinafter, GPC for brevity).

EXAMPLES 2 AND 3

The amount of the used paraformaldehyde was varied to 35.2 g (Example 2) and 38.4 g (Example 3), and other conditions were the same as the Example 1. After analogous reaction, two kinds of resins were obtained.

The number average molecular weight of each resin, as measured by means of a vapour pressure method (in methyl ethyl ketone, at 40° C.) was 3,400 and 4,200, respectively; and the softening point thereof, as measured by means of a microscope method, was 175° C. and 190° C., respectively. The Q-value of each resin, as measured by GPC, was 6.8 and 10.0, respectively.

EXAMPLE 4

108 g of o-cresol and 32 g of paraformaldehyde were added to 240 g of n-butanol, and 10 g of sulfuric acid was further added thereto. The whole contents were put in a reactor and heated at 110° C. While heated, an azeotropic mixture comprising butanol and water formed during the reaction was formed. Then, the water was separated from the butanol and removed out from the reaction system. After reacted for 4 hours, the reaction mixture was neutralized with 350 g of water containing 17 g of NaHCO$_3$ and an aqueous layer was separated out with a separating funnel 350 g of water was further added to the reaction solution and washed, and then the aqueous layer was again separated off. After thus washed with water, the remaining product solution was heated to distill n-butanol out of the solution, and thereafter the remaining n-butanol was further removed off under reduced pressure. Thus, the resin formed which fused at 200° C. was taken out, and cooled, to obtain a solid resin.

This resin showed the same solvent solubility as the resin of Example 1. The number average molecular weight of this resin was 2,750, and the softening point thereof was 158° C.

EXAMPLE 5

108 g of o-cresol was dissolved in 150 g of acetic acid, and 4 g of sulfuric acid was added thereto and the whole contents were put in a reactor and heated at 110° C. Apart from this, 32 g of paraformaldehyde was added to 200 g of acetic acid, and 6 g of sulfuric acid was added thereto and heated up to 80° C., while stirred, whereby paraformaldehyde dissolved. Afterwards, the obtained solution was put in a dropping funnel and as gradually added dropwise to the above-obtained o-cresol/acetic acid solution in the course of one hour and these were reacted. After the addition, the whole contents were further stirred for 2 hours at 110° C., and then put into 3 l of water, while rapidly stirred. The precipitated resin was filtrated out, washed with water and dried, at last to obtain 115 g of the aimed resin.

The number average molecular weight of this resin was 2,900, and the softening point thereof was 165° C.

EXAMPLE 6

108 g of o-cresol, 30 g of trioxane and 240 g of butyl cellosolve were put in a reactor together with 20 g of p-toluenesulfonic acid, and reacted for 6 hours at 135° C. while stirred.

After the reaction, the reaction solution was put into 2 l of water containing 11 g of NaHCO$_3$, while stirred, and the precipitated resin was filtrated out and dried, to obtain 113 g of a resin.

The number average molecular weight of the resin was 2,850, and the softening point thereof 163° C.

EXAMPLE 7 n-Hexanol was used as a solvent instead of n-butanol, and the reaction was carried out at 130° C., and other conditions were the same as in Example 4. 115 g of a resin was obtained, having a number average molecular weight of 2,800 and a softening point of 160° C.

EXAMPLE 8

86.4 g (0.8 mole) of o-cresol and 21.6 g (0.2 mole) of p-cresol were dissolved in 240 g of methyl cellosolve, and 32 g of paraformaldehyde and 10 g of sulfuric acid were added thereto and reacted for 6 hours at 105° C. while stirred.

17 g of NaHCO$_3$ and 30 g of water were added to the reaction solution to neutralize the same, and the reaction product was put in 2 l of water while stirred. Thus, the precipitated resin was filtrated out and dried, to obtain 112 g of a resin. This resin has a number average molecular weight of 2,600 and a softening point of 165° C. This was soluble in methanol and acetone.

EXAMPLE 9

108 g of o-cresol, 29.3 g of paraformaldehyde and 240 g of n-butanol were put in a reactor together with 15 g of p-toluenesulfonic acid, and reacted for 4 hours at 110° to 115° C., while stirred. During the reaction, the formed water was removed off out of the reaction system with a separator.

After the reaction was completed, the reaction product was neutralized with 300 g of water containing 17 g of NaHCO$_3$ and rinsed, and the butanol layer was removed off Afterwards, the reaction mixture was heated and the butanol was further removed off by distillation under heat, and then a resin fused at 190° C. was taken out, which was thereafter cooled, to obtain 115 g of a resin. The number average molecular weight of this resin was 1,900 and the softening point thereof was 130° C.

This resin was easily soluble in methanol and acetone

EXAMPLE 10

86.4 g (0.8 mole) of o-cresol and 21.6 g (0.2 mole) of p-cresol were dissolved in 240 g of ethyl cellosolve, and 29.3 g of paraformaldehyde and 10 g of sulfuric acid were added thereto and reacted for 6 hours at 115° C. while stirred.

17 g of NaHCO$_3$ and 30 g of water were added to the reaction solution to neutralize the same, and the reaction product was put in 2 l of water while stirred. Thus, the precipitated resin was filtrated out and dried, to obtain 112 g of a resin. This resin has a number average molecular weight of 1,800 and a softening point of 135° C.

This resin was soluble in methanol, ethanol, butanol, acetone, methyl ethyl ketone, methyl cellosolve, ethyl cellosolve, tetrahydrofuran, dioxane and ethyl acetate, but was insoluble in benzene, toluene, chloroform and trichloroethylene.

COMPARATIVE EXAMPLE 1

108 g of p-cresol, 32 g of paraformaldehyde and 800 g of ethyl cellosolve were put in a reactor together with 10 g of sulfuric acid and reacted for 6 hours at 115° C. while stirred.

After the reaction, the reaction mixture was neutralized with 30 g of water and 17 g of NaHCO$_3$, and then this was put in 4 l of water while rapidly stirred. The precipitated resin was filtrated out and dried, to obtain 117 g of a resin.

The number average molecular weight of this resin, as measured by means of a vapour pressure method using dimethylacetamide, was 1,800, and the softening point thereof was 300° C. or higher.

This resin was soluble in tetrahydrofuran, dioxane, dimethylacetamide and dimethylformamide, but was insoluble in alcohols such as methanol, ethanol and butanol; ketones such as acetone, methyl ethyl ketone and methyl isobutyl ketone; and aromatic hydrocarbons such as benzene, toluene and xylene. This resin was soluble in glycol ethers such as methoxyethanol and ethoxyethanol, but formed white and cloudy solution.

63 g of the thus obtained p-cresol-novolak resin was blended with 25 g of "Epikote 828" (trade name by Yuka Shell Epoxy Co.), which is a bisphenol A diglycidyl ether, and heated up to 150° C. while stirred. However, the mixture did not become transparent but remained to be a suspended state. Thus, the formed p-cresol-novolak resin did not wholly dissolve in the epoxy resin.

COMPARATIVE EXAMPLE 2

108 g of o-cresol, 73 g of 37% formalin and 1 g of oxalic acid were put in a reactor and reacted for 1 hour at 90° C. and then for 4 hour at 120° C.

After the reaction was completed, 100 g of water was added to the reaction mixture to precipitate the formed resin. Afterwards, water was removed out by decantation and the reaction product was further dehydrated under a reduced pressure of 100 mmHg and thereafter gradually heated When the temperature of the reaction product reached 140° C., the formed resin was taken out in the form of a fused state, and then cooled and solidified and then pulverized. Thus, 115 g of a resin was obtained. The number average molecular weight of this resin, as measured by means of a vapour pressure method, was 490, and the softening point thereof, as measured by means of a microscope method, was 60° C.

USE EXAMPLE 1

16 g of the linear and high molecular weight o-cresol-novolak resin obtained in Example 1, 25 g of a phenol-novolak-epoxy resin ("Epikote 154", trade name by Shell Co.), 0.15 g of 2-ethyl-4-methyl-imidazole and 150 g of silica powder were hot kneaded for 5 minutes with hot rolls at 100° C., and then cooled and pulverized to prepare a base molding composition (hereinafter, "BMC" for brevity).

The thus obtained BMC was put in a mold and hardened for 10 minutes with a hot press of 170° C. and 50 kg/cm$^2$. The shaped article was then released from the mold and thereafter further posthardened for 6 hours at 230° C., at last to obtain a hardened article having properties as shown in Table 1, which is given below.

USE EXAMPLES 2 AND 3

Each of the linear and high molecular weight o-cresol-novolak resins obtained in Examples 2 and 3 was used and other conditions were the same as in Use Example 1, to obtain two different kinds of BMC. Each of these was hardened to obtain a hardened article, and the properties thereof are given in the following Table 1.

USE EXAMPLE 4

63 g of the high molecular weight o-cresol-novolak resin obtained in Example 1, 100 g of bisphenol A type epoxy resin ("Epikote 828") and 1 g of BF$_3$.2-methylimidazole were dissolved in 150 g of acetone, to obtain a varnish composition.

A glass cloth having a thickness of 0.18 mm was impregnated with this varnish composition, and then dried for 7 minutes at 160° C., to obtain a B-staged prepreg. Eight sheets of these prepregs were laminated and hot pressed at 180° C. for 10 minutes under a pressure of 40 kg/cm$^2$, to obtain a laminated plate having a thickness of about 1.6 mm. This laminated plate was hardened at 180° C. for 2 hours and at 200° C. for 4 hours.

The bending strength of the laminated plate was 52 kg/mm$^2$ at 20° C., 45 kg/mm$^2$ at 150° C. and 30 kg/mm$^2$ at 200° C.

USE EXAMPLE 5

25 g of the linear and high molecular weight o-cresol-novolak resin obtained in Example 1, 40 g of epoxidated o-cresol-novolak epoxy resin (epoxy equivalent: 220, "Eqikoto 181" manufactured by Yuka Shell Epoxy Co.), 10 g of brominated bisphenol A epoxy resin (epoxy equivalent: 395, Br content 50%, "Epikote 1050" manufactured by Yuka Shell EPOXY Co.), 0.5 g of 2-methylimidozole, 0.5 g of γ-glycidoxypropyltrimethoxysilane, 1 g of carnauba wax and 150 g of silica were hot kneaded with hot rolls at 100° C. for 10 minutes, and then cooled and pulverized to obtain an epoxy molding material.

This molding material was subjected to transfer molding at a temperature of 170° C. and under a pressure of 80 kg/cm². After molding, the shaped article was posthardened at 180° C. for 2 hours and at 230° C. for 4 hours, at last to obtain a hardened article having a bending strength of 13.8 kg/mm² and a glass transition temperature of 240° C.

USE EXAMPLE 6

63 g of the linear and high molecular weight o-cresol-novolak resin obtained in Example 1, 100 g of bisphenol A type epoxy resin (epoxy equivalent: 190, "Epikote 828"), 1 g of BF$_3$.2-methylimidazole and 20 g of carboxyl-containing nitrile rubber ("Hicar CTBN 1300×8" manufactured by Ube Industries, Ltd.) were hot kneaded with hot rolls at 80° C. for 10 minutes, and then cooled and pulverized to obtain an adhesive.

Thus obtained powdery adhesive composition was put on a sand-blasted mild steel plate, which was then heated at 140° C. to fuse the adhesive composition. Two steel plates were sticked, as the fused adhesive being sandwiched therebetween. The shearing adhesive strength of the two sticked plates was 150 kg/cm² at 20° C. and 122 kg/cm² at 150° C.

REFERENCE EXAMPLE 1

108 g of o-cresol, 73 g of 37% formalin and 1 g of oxalic acid were put in a reactor and reacted for 1 hour at 90° C. and then for 4 hours at 120° C. After the reaction was completed, 100 g of water was added to the reaction mixture to precipitate the formed resin. Water was removed out by decantation, and then the reaction product was further dehydrated under reduced pressure of 100 mmHg. Afterwards, the reaction product was gradually heated, and when the temperature thereof reached 140° C., the fused resin was taken out and solidified and then pulverized. Thus, 115 g of a resin was obtained.

This resin had a number average molecular weight of 490 (as measured by vapour pressure method) and a softening point of 60° C. (as measured by microscope method).

COMPARATIVE USE EXAMPLE 1

100 g of o-cresol-novolak resin obtained in the Reference Example 1, 7 g of paraformaldehyde and 1 g of p-toluenesulfonic acid were put in a reactor together with 250 g of o-dichlorobenzene and reacted for 4 hours at 170° C., whereupon the distilled water was removed out. After the reaction, o-dichlorobenzene was distilled out under reduced pressure of 10 mmHg, and the temperature of the reaction mixture was gradually elevated up to 180° C., at which a fused resin which was formed by the reaction was taken out and then cooled.

The resin obtained had a number average molecular weight of 1,300, as measured by vapour steam method (in methyl ethyl ketone at 40° C.) and a softening point of 108° C. as measured by a microscope method.

COMPARATIVE USE EXAMPLES 2 AND 3

The novolak resins obtained in Reference Example 1 and Comparative Example 1 were used, and other conditions (such as epoxy resin, accelerator and silica powder) were the same as in Use Example 1, to obtain two kinds of BMC's.

These BMC's were hardened analogously to Use Example 1, to obtain hardened articles each having properties as shown in the following Table 1.

TABLE 1

|  | Use Example 1 | Use Example 2 | Use Example 3 | Comparative Use Example 2 | Comparative Use Example 3 |
| --- | --- | --- | --- | --- | --- |
| Heat Distortion Temperature (°C.) | >250 | >250 | >250 | 165 | 196 |
| Flexural Strength |  |  |  |  |  |
| 20° C. | 12.0 | 12.0 | 12.5 | 9.0 | 11.0 |
| 150° C. | 8.0 | 8.5 | 8.5 | No strength | 5.0 |
| Flexural Modulus of Elasticity |  |  |  |  |  |
| 20° C. (kg/mm²) | 1200 | 1250 | 1250 | 1000 | 1050 |
| Izod Impact Strength (kg · cm/cm²) | 1.8 | 1.8 | 1.9 | 1.5 | 1.6 |
| Rockwell Hardness | 120 | 120 | 120 | 105 | 110 |

USE EXAMPLE 7

16 g of the high molecular weight o-cresol-novolak resin obtained in Example 1, 25 g of bisphenol A type epoxy resin (epoxy equivalent: 190, "Epikote 828" manufactured by Yuka Shell Epoxy Co ), 0.25 g of BF$_3$.2-methylimidazole. 95 g of fused silica powder and 0.75 g of montan wax were hot kneaded with hot rolls at 100° C. for 5 minutes, and then cooled and pulverized to a grain size of 20 to 100 μm, to obtain a molding material.

The material was put in a mold and hardened by hot pressing at 170° C. with a pressure of 50 kg/cm² for 10 minutes. After hardened, the shaped article was released from the mold and then further posthardened at 250° C. for 1 hour, at last to obtain a hardened article having properties shown in Table 2 below.

USE EXAMPLES 8 AND 9

Each of the high molecular weight o-cresol-novolak resins obtained in Examples 3 and 9 was used, and other conditions were the same as Example 1, to obtain two kinds of molding materials, which were then hardened to obtain hardened products having properties shown in Table 2 below.

USE EXAMPLES 10 AND 11

Each of the high molecular weight o-cresol/p-cresol random copolymerized novolak resins obtained in Examples 4 and 5 was used and other conditions were the same as in Example 1, to obtain two kinds of molding materials. These were hardened, and hardened products having properties as shown in Table 2 below were obtained.

COMPARATIVE USE EXAMPLES 3 AND 4

The high molecular weight p-cresol-novolak resin and the low molecular weight o-cresol-novolak resin obtained in Comparative Examples 1 and 2, respectively, were used, and other conditions were the same as in Use Example 9, to obtain two kinds of molding materials.

These were hardened, and hardened products having properties as shown in Table 2 below were obtained.

In Comparative Use Example 3, the compatibility of the resin was poor and no sufficient properties could be attained. In Comparative Example 4, although the compatibility of the resin was good, the molecular weight of the used o-cresol-novolak resin was too small and no sufficient properties could be attained.

dyl ether (epoxy equivalent: 395, Br-content: 50%, "Epikote 1050" manufactured by Yuka Shell Epoxy Co ), 0.5 g of 2-phenylimidazole, 0.5 g of γ-glycidoxypropyltrimethoxysilane, 1 g of carnauba wax, 150 g of silica and 3 g of antimony trioxide were hot kneaded with hot rolls at 100° C. for 10 minutes, and then cooled and pulverized to a grain size of 20 to 100 μm, to obtain a molding material for semiconductor sealants.

Using this molding material, model silicone elements were transfer-molded under a molding condition of 180° C. for 3 minutes, and thereafter these were posthardened at 180° C. for 5 hours. The hardened articles

TABLE 2

| | Use Example 7 | Use Example 8 | Use Example 9 | Use Example 10 | Use Example 11 | Comparative Use Example 3 | Comparative Use Example 4 |
|---|---|---|---|---|---|---|---|
| Heat Distortion Temperature (°C.) | >250 | >250 | 225 | >250 | 218 | 220 | 162 |
| Flexural Strength (20° C., kg/mm$^2$) | 14.9 | 15.8 | 14.1 | 14.5 | 13.7 | 9.4 | 9.0 |
| Flexural Modulus of Elasticity (20° C., kg/mm$^2$) | 1300 | 1350 | 1200 | 1380 | 1200 | 1150 | 1000 |
| Izod Impact Strength (kg · cm/cm$^2$) | 2.0 | 2.1 | 1.9 | 2.1 | 1.9 | 1.1 | 1.5 |
| Rockwell Hardness | 120 | 120 | 115 | 125 | 115 | 120 | 105 |

USE EXAMPLE 12

25 g of the linear and high molecular weight o-cresol-novolak resin obtained in Example 1, 40 g of epoxidated o-cresol-novolak-epoxy resin [epoxy equivalent: 220, "Epikote 181" manufactured by Yuka Shell Epoxy Co.), 10 g of brominated phenol-novolak-epoxy resin (epoxy equivalent: 290, Br content: 36%, "BREN" manufactured by Nippon Kayaku Co.), 0.5 g of 2-methylimidazole, 0.5 g of β-(3,4-epoxycyclohexyl)ethyltrimethoxysilane, 1 g of carnauba wax, 150 g of silica and 3 g of antimony trioxide were hot kneaded with hot rolls at 100° C. for 10 minutes, and then cooled and pulverized to a grain size of 20 to 100 μm, to obtain a molding material for semiconductor sealants.

Using this molding material, model silicone elements were transfer molded under a molding condition of 180° C. for 3 minutes. These were thereafter posthardened at 180° C. for 5 hours. The thus molded element parts were then subjected to heat shock cycle test with a temperature cycle of from −65° C. to 125° C. After one hundred times of said heat cycles, occurrence of fraction defective was observed, and in the result, no defective was found in one hundred element parts as tested (percent defective: 0/100). With respect to the pressure-resistance of these element parts, no deterioration was noted after 2,000 hours at 85° C. in a humidity of 95%.

The bending strength of the moulded articles was 14.8 kg/mm$^2$, and the glass transition temperature thereof was 210° C.

The products were further posthardened at 230° C. for 4 hours, and the glass transition temperature thereof rose up to 240° C.

USE EXAMPLE 13

28 g of the linear and high molecular o,p-cresol-random copolymer resin as used in Use Example 10, 30 g of tetrahydroxyphenolethaneglycidyl ether (epoxy equivalent 195, "Epikote 1031" manufactured by Yuka Shell Epoxy Co.), 10 g of bisphenol A-glycidyl ether (epoxy equivalent 190, "Epikote 828" manufactured by Yuka Shell Epoxy Co ), 10 g of brominated bisphenol A glyciwere subjected to the same heat shock cycle test as in Use Example 12, and no fraction defective occurred. With respect to the pressure resistance of these articles, no deterioration was noted after 2,000 hours at 85° C. in a humidity of 95%.

The bending strength of the molded articles was 15.6 kg/mm$^2$, and the glass transition temperature thereof was 215° C. These were further posthardened for 4 hours at 230° C., and the glass transition temperature thereof exceeded over 240° C.

COMPARATIVE USE EXAMPLE 5

21 g of the high molecular weight p-cresol-novolak resin obtained in Comparative Example 1 was used instead of the linear and high molecular weight o-cresol-novolak resin obtained in Example 1 and used in Use Example 12, and other conditions were the same as in Use Example 12, to obtain a molding material for semiconductor sealants.

The obtained material was then analogously hardened and transfer molded, and thereafter subjected to the same heat shock cycle test as in Use Example 12. In the result, 55 defective articles occurred, and in the same pressure resistance deterioration test, the tested articles were broken after 2,000 hours at 85° C. in a humidity of 95%.

COMPARATIVE USE EXAMPLE 6

21 g of the low molecular weight o-cresol-novolak resin obtained in Comparative Example 2 was used instead of the linear and high molecular weight o-cresol-novolak resin obtained in Example 1 and used in Use Example 12, and other conditions were the same as in Use Example 12, to obtain a molding material for semiconductor sealants.

The obtained material was then analogously hardened and transfer molded, and thereafter subjected to the same heat shock cycle test as in Use Example 12. In the result, 10 defective articles occurred, and in the same pressure resistance deterioration test, 75% of the tested articles were deteriorated after 2,000 hours at 85° C. in a humidity of 95%. The bending strength of the molded articles was 9.5 kg/mm², and the glass transition temperature thereof was 155° C. After further posthardening at 230° C. for 4 hours, the glass transition temperature rose up to 172° C.

USE EXAMPLE 14

28 g of the linear and high molecular weight o-cresol-novolak resin obtained in Example 1, 40 g of epoxidated o-cresol-novolak-epoxy resin (epoxy equivalent: 220, "Epikote 181" manufactured by Yuka Shell Epoxy Co.), 10 g of bisphenol A type epoxy resin (epoxy equivalent: 450, "Epikote 1001" manufactured by Yuka Shell Epoxy Co.), 0.5 g of 2-methylimidazole, 40 g of silica powder and 0.2 g of a levelling silicone additive ("L-7500", manufactured by Nippon Unicar Co.) were hot kneaded with hot rolls at 100° C. for 10 minutes, and then cooled and pulverized and classified to a grain size of 100-mesh or less, to obtain a powdery coating material.

This coating material was put in a fluidized bed for powder coating, and then was coated on an iron plate preheated at 140° C. and on a model coil preheated at 160° C., each forming a coated layer thereon having a thickness of 200 μm. After coating, these were heated at 200° C. for 1 hour and posthardened.

Apart from this, a tensile shear strength test was carried out, according to JIS K-6850, as follows The above obtained coating material was applied to an iron plate and two iron plates were sticked and hot pressed and posthardened at 200° C. for 1 hour. The tensile shear strength was measured to be 180 kg/cm².

The coated coils as manufactured above (10 coils in all) were subjected to heat shock cycle test with a temperature cycle of from 20° C. to 120° C., and in the result, no crack occurred. The coated iron plates were subjected to hammer impact test, and no crack occurred. The coated film kept the strength even at 200° C.

USE EXAMPLE 15

The linear and high molecular weight o-,p-cresol-random copolymerized novolak resin used in Use Example 10 was used instead of the linear and high molecular weight o-cresol-novolak resin used in Use Example 14, and other conditions were the same as in Use Example 14, to obtain a powdery coating material, which was then subjected to the same tests.

The shearing adhesive strength of the coated layer was 185 kg/cm², and no crack occurred in the heat shock cycle test of coated coils and in the hammer impact test of the coated iron plates. The coated film kept the strength even at 200° C.

COMPARATIVE USE EXAMPLE 7

The low molecular weight o-cresol-novolak resin obtained in Comparative Example 2 was used instead of the linear and high molecular weight o-cresol-novolak resin used in Use Example 14, and other conditions were the same as in Use Example 14, to obtain a powdery coating material, which was then subjected to the same tests.

The shearing adhesive strength of the coated layer was 135 kg/cm², and cracks occurred both in the heat shock cycle test of coated coils and in the hammer impact test of the coated iron plates. After heated at 200° C., the coated film became softened and was easily peeled off.

USE EXAMPLE 16

100 g of bisphenol type epoxy resin ("Epikote 828" manufactured by Yuka Shell Epoxy Co.), 63 g of the high molecular weight o-cresol-novolak resin obtained in Example 1, 1 g of 2-ethyl-4-methylimidazole and 108 g of acetone were blended and molten to obtain a varnish. In this composition, the epoxy equivalent of the epoxy resin to one OH equivalent of the novolak resin was one. The obtained varnish was uniform and transparent.

A plain weave glass fabric ("7628" manufactured by Asahi Schueber) having a thickness of 0.18 mm, which had previously been silane treated, was impregnated with the above obtained varnish and heated at 100° C. for 10 minutes to obtain a B-staged prepreg. This prepreg had a uniform resin.

Eight sheets of the prepregs were laminated, and the laminated sheet was then sandwiched with copper foils, as follows: A back surface of each of two copper foils was first coarsened by electrolysis to form fine copper grains thereon, and then the coarsened surface was subjected to chromate treatment with sodium bichromate to form a chromate film thereon. The above laminated sheet was sandwiched with these copper foils each having a thickness of 35 μm, and then hot pressed at 160° C. under a pressure of 40 kg/cm², to obtain a copper-clad laminate sheet. This was hardened by heating at 170° C. for 2 hours, and then at 200° C. for 4 hours. Properties of the hardened laminated sheet thus obtained are given in Table 3 below.

USE EXAMPLE 17

Instead of acetone in Use Example 16 was used a mixed solvent comprising 54 g of methanol and 54 g of methyl ethyl ketone, and other conditions were the same as in Use Example 16, to obtain a varnish. A laminated sheet was analogously obtained, and the properties thereof are given in Table 3 below.

USE EXAMPLE 18

60 g of tetraphenolethane-glycidyl ether ("Epikote 1031" manufactured by Yuka Shell Epoxy Co.), 40 g of brominated bisphenol A epoxy resin ("Epikote 1050" manufactured by Yuka Shell Epoxy Co.), 52 g of the high molecular weight o-cresol-novolak resin obtained in Example 2, 1 g of BF₃.2-methylimidazole and 100 g of methyl ethyl ketone were blended to obtain a varnish. This varnish was uniformly molten and was transparent. In this composition, the epoxy equivalent of the epoxy resin to one OH-equivalent of the novolak resin was one.

A plain weave glass fabric ("7628" by Asahi Schueber Co.) having a thickness of 0.18 mm, which has previously been silane treated, was impregnated with the above obtained varnish and heated at 100° C. for 8 minutes to obtain a B-stated prepreg.

Eight sheets of these prepregs were laminated, and then the laminated sheet was sandwiched with copper foils each having a thickness of 35 μm, analogously to Use Example 16, and hot pressed at 170° C. under a pressure of 40 kg/cm², to obtain a copper-clad laminate sheet. This was hardened by heating at 170° C. for 2 hours, and then at 230° C. for 4 hours. Properties of the hardened laminated sheet thus obtained are given in Table 3 below.

USE EXAMPLE 19

60 g of phenol-novolak-glycidyl ether ("Epikote 154" manufactured by Yuka Shell Epoxy Co.), 40 g of brominated phenol-novolak-glycidyl ether ("BREN" manufactured by Nippon Kayaku Co.), 57 g of the high molecular weight novolak resin obtained in Example 8, 1 g of 1-benzyl-2-methylimidazole and 105 g of methyl ethyl ketone were blended to obtain a varnish. This was uniform and transparent. In this composition, the epoxy equivalent of the epoxy resin to one OH equivalent of the novolak resin was one.

Using this varnish, a laminated sheet was formed, analogously to Use Example 16, and the properties of the obtained laminated sheet are given in Table 3 below.

USE EXAMPLE 20 o-Cresol-novolak resin obtained in Example 9 was used, and other conditions were the same as in Use Example 16, to obtain a varnish. A laminated sheet was obtained therefrom, analogously. In this varnish composition, the epoxy equivalent of the epoxy resin to one OH equivalent of the novolak resin was one.

The obtained varnish was uniform and transparent, and the formed prepregs were also uniform. The properties of the formed laminated sheet are given in Table 3 below.

COMPARATIVE USE EXAMPLE 8

100 g of bisphenol type epoxy resin (same resin as used in Use Example 16), 63 g of the cresol-novolak resin obtained in Comparative Example 1 (in the form of a powder obtained by reprecipitation), 1 g of $BF_3.2$-methylimidazole and 108 g of methyl ethyl ketone were blended to obtain a varnish. In this composition, the epoxy equivalent to one OH equivalent was one. This varnish was non-uniform and cloudy, as the used novolak resin did not dissolve in methyl ethyl ketone.

Using this varnish were formed prepregs, in the same manner as in Use Example 16. The formed prepregs were non-uniform, since the impregnation of the varnish to glass cloth was poor. This is because the novolak resin powder did not dissolve in the varnish but remained therein in the form of a dispersion.

These prepregs were used and other conditions were the same as in use Example 16, to obtain a laminated sheet. This has insufficient strength and adhesiveness, as shown in Table 3 below.

COMPARATIVE USE EXAMPLE 9

The novolak resin obtained in Comparative Example 2 was used and other conditions were the same as in Use Example 16, to obtain a varnish. Using this varnish were formed prepregs in the same manner as in Use Example 16, and a laminated sheet was also manufactured analogously. Properties of the obtained laminated sheet are given in Table 3 below. As apparent therefrom the heat resistance of the sheet is insufficient.

TABLE 3

|  | Use Example 16 | Use Example 17 | Use Example 18 | Use Example 19 | Use Example 20 | Comparative Use Example 8 | Comparative Use Example 9 |
|---|---|---|---|---|---|---|---|
| Flexural Strength (kg/mm$^2$) | | | | | | | |
| 20° C. | 53 | 50 | 48 | 50 | 51 | 34 | 45 |
| 150° C. | 40 | 39 | 45 | 45 | 39 | 27 | 18 |
| 200° C. | 31 | 31 | 41 | 35 | 24 | 20 | 8 |
| Copper Foil Peeling Strength (kg/cm) | 1.8 | 1.8 | 1.6 | 1.8 | 1.5 | 0.9 | 1.2 |
| Solder Resistance (min.) 260° C. | >10 | >10 | >10 | >10 | >10 | 6 | 5 |
| Shearing Strength (kg/mm$^2$) | | | | | | | |
| 100° C. × 1 Hour | 3.5 | 3.5 | 3.4 | 3.5 | 3.3 | 2.5 | 2.9 |
| Boiling | 3.2 | 3.1 | 3.2 | 3.0 | 2.9 | 1.8 | 2.4 |

Notes:
Measuring methods were as follows:
Bending strength: JIS C6481
Copper foil peeling strength: JIS C6481
Solder resistance: JIS C6481
Shearing strength: ASTM D2344 (Short Beam Method)

USE EXAMPLE 21

60 g of phenol-novolak glycidyl ether ("Epikote 154" manufactured by Yuka Shell Epoxy Co.), 40 g of brominated phenol-novolak-glycidyl ether ("BREN" manufactured by Nippon Kayaku Co.), 57 g of the cresol-novolak resin obtained in Example 2, 1 g of 1-benzyl-2-methylimidazole and 105 g of methyl ethyl ketone were blended to obtain a varnish. In this composition, the epoxy equivalent to one OH equivalent was one. The obtained varnish was uniform and transparent.

A plain weave glass fabric (same as used in Use Example 16) having a thickness of 0.18 mm, which was previously been silane treated, was impregnated with the above obtained varnish and heated at 100° C. for 8 minutes to obtain a B-staged prepreg.

Two sheets of the prepregs were laminated, and then the laminated sheet was sandwiched with copper foils each having a thickness of 35 μm, analogously to Use Example 16, and hot pressed at 170° C. under a pressure of 40 kg/cm$^2$, to obtain a copper-clad laminate sheet. This was etched to form a circuit plate.

Two sheets of the above obtained prepregs were interposed between each of three sheets of the circuit plates and hot-pressed at 170° C. under a pressure of 80 kg/cm$^2$, to obtain a multilaminated circuit plate. This was drilled with a drill, and then copper plated. Thus, an excellent multilaminate circuit base plate was obtained, having no defect.

USE EXAMPLE 22

60 g of phenol-novolak resin-glycidyl ether ("Epikote 154" manufactured by Yuka Shell Epoxy Co.), 40 g of brominated phenol-novolak-glycidyl ether ("BREN" manufactured by Nippon Kayaku Co.), 57 g of the high molecular weight cresol-novolak resin obtained in Example 1, 1 g of 2-phenylimidazole, 4 g of fine silica powder ("Aerosil 380" manufactured by Nippon Aerosil Co.), 20 g of talc, 0.5 g of defoaming agent ("L-722" manufactured by Nippon Unicar Co.), 3 g of Phthalocyanine Green and 45 g of n-ethylcarbitol were blended at room temperature, to prepare a solder resist ink. In this composition, the epoxy equivalent of the epoxy resin to one OH equivalent of the novolak resin was one.

The obtained ink was coated on a copper through hole type polyimide base plate using a screen printing apparatus (180 mesh, polyester plate, thickness of emulsion layer: 20μ, to form a layer having a thickness of about 25 μm thereon, which was then heated at 200° C. for 60 minutes to harden the coated film. Thus, a copper-clad plate for a printed circuit plate, having a protective resist layer, was obtained.

The properties of the protective resist layer thus formed were tested, and the results are given in Table 4 below. "Adhesion Strength": JIS C-0202 square adhesion test.

One hundred squares each having a size of 1 mm×1 mm were notched on the coated surface of a sample and the notched squares were tried to be peeled using a cellophane adhesive tape. Counting the number of the peeled squares, the adhesion strength of the coated film was evaluated.

"Solder Resistance": JIS C-6481

A coated sample was dipped in a molten Sn(60%)-solder at 260° C. for 2 minutes and for 4 minutes, and the appearance of the coated layer, after dipping, was observed. The evaluation was based upon the following standard:
O: No deterioration was noted on the appearance of the coated layer, after dipping.
X: The coated layer was found to be blistered, peeled or molten, after dipping.

"Heat Deterioration Test": JIS C-6481

A sample was aged in an oven at 250° C. for 72 hours, and the adhesion and the appearance of the coated film were observed. The evaluation was based on the following standard:
O: No deterioration was noted.
X: The coated layer was blistered or peeled.

USE EXAMPLE 23-25

Ingredients given in Table 4 below were used and other conditions were the same as in Use Example 22, to obtain three kinds of solder resist inks. Using these, copper-clad plates for printed circuits, each having a protective resist layer, were obtained in the same manner as in Use Example 22. The properties of the formed protective resist layers were given in Table 4. In each of these compositions, the epoxy equivalent of the epoxy resin to one OH equivalent cf the novolak resin was one

COMPARATIVE USE EXAMPLES 10 AND 11

Ingredients given in Table 4 below were used and other conditions were the same as in Use Example 22, to obtain two kinds of solder resist inks. Using these, copper-clad plates for printed circuits, each having a protective resist layer, were obtained in the same manner as in Use Example 22. The properties of the formed protective resist layers were given in Table 4 below.

TABLE 4

| Ingredients of Solder-Resist Ink (g) | Use Example 22 | Use Example 23 | Use Example 24 | Use Example 25 | Comparative Use Example 10 | Comparative Use Example 11 |
|---|---|---|---|---|---|---|
| Epikote 154 | 60 | — | 60 | 60 | 60 | 60 |
| Epikote 828 | — | 60 | — | — | — | — |
| Epikote 1050 | — | 40 | — | — | — | — |
| BREN | 40 | — | 40 | 40 | 40 | 40 |

| | Example 1 | Example 2 | Example 8 | Example 9 | Compar. Example 1 | Compar. Example 2 |
|---|---|---|---|---|---|---|
| Cresol-novolak Resin | 57 | 50 | 57 | 57 | 57 | 57 |
| 2-Phenylimidazole | 1 | — | 1 | 1 | 1 | 1 |
| BF$_3$.2-Methylimidazole | — | 1 | — | — | — | — |
| Butyl Cellosolve | — | 40 | — | — | — | — |
| Ethyl Carbitol | 45 | — | 45 | 45 | 45 | 45 |
| Total of Other Additives | 24.5 | 24.5 | 24.5 | 24.5 | 24.5 | 24.5 |

| Properties of Protective Film | Use Example 22 | Use Example 23 | Use Example 24 | Use Example 25 | Comparative Use Example 10 | Comparative Use Example 11 |
|---|---|---|---|---|---|---|
| Adhesion Strength | 100/100 | 100/100 | 100/100 | 100/100 | 0/100 | 75/100 |
| Solder Resistance 2 min. | 0 | 0 | 0 | 0 | 0 | X |
| 4 min. | 0 | 0 | 0 | 0 | X | X |
| Heat Deterioration Resistance | 0 | 0 | 0 | 0 | X | X |
| Interwire Insulating Resistance (Ω) | $2 \times 10^{12}$ | $1 \times 10^{12}$ | $4 \times 10^{12}$ | $2 \times 10^{12}$ | $1 \times 10^{10}$ | $5 \times 10^{11}$ |

While the invention has been described in detail and by reference to specific embodiments therein, it will be apparent to one skilled in the art that various changes and modifications can be made therein without departing from the spirit and scope thereof.

What is claimed is:

1. A process for preparing a high molecular weight cresol-novolak resin having a softening point of 30° C. or higher, consisting essentially of polycondensing orthocresol or a mixture of orthocresol and paracresol with an aldehyde compound or a derivative thereof in a solvent selected from the group consisting of $C_{3-12}$ aliphatic monoalcohols, $C_{3-6}$ monohydric glycol ethers and benzyl alcohol, in the presence of a protonic acid catalyst.

2. The process as claimed in claim 1, wherein said aldehyde is paraformaldehyde.

3. The process as claimed in claim 1, wherein said solvent is selected from the group consisting of methyl cellosolve, ethyl cellosolve, butyl cellosolve, and n-butanol.

4. The process as claimed in claim 1, wherein the amount of said solvent to be used is 150 to 300 parts by weight per 100 parts by weight of orthocresol.

5. The process of claim 1, wherein said polycondensing step consisting essentially of:
   mixing said orthocresol or said mixture of orthocresol and paracresol, said aldehyde compound, said solvent and said catalyst to form a reaction mixture; and
   heating said reaction mixture.

6. The process of claim 1, wherein said polycondensing step consisting essentially of:
   mixing one of (a) said orthocresol or a mixture of orthocresol and paracresol, or (b) said aldehyde compound, said solvent, and said catalyst to form a reaction mixture;
   heating said reaction mixture; and
   adding said catalyst and one of (a) or (b) which was not used in said mixing step.

7. The method of claim 1, wherein said polycondensing step consisting essentially of the steps of:
   mixing said orthocresol or said mixture of orthocresol and paracresol, said aldehyde component, and said solvent to form a reaction mixture;
   heating said reaction mixture; and
   adding said catalyst to said heated reaction mixture.

8. The process of claim 1, wherein said polycondensing step is conducted at a temperature of 95° C. or higher.

9. The process of claim 8, wherein said polycondensing step is conducted at a temperature between about 105°–150° C.

10. The process of claim 1, wherein water is present in an amount of 15 wt. % or less during said polycondensing step.

11. The method of claim 10, wherein said water is present in an amount of 10 wt. % or less during said polycondensing step.

* * * * *